T. F. HATTON & J. F. RECORD.
ROTARY CHURN.
No. 191,676. Patented June 5, 1877.
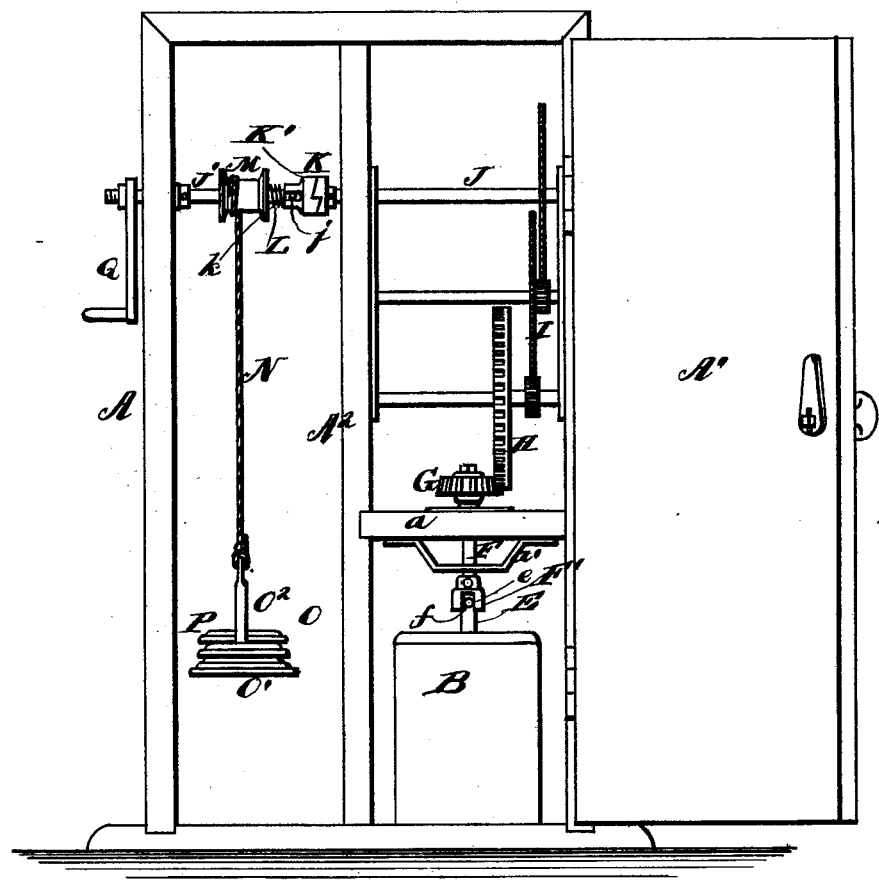
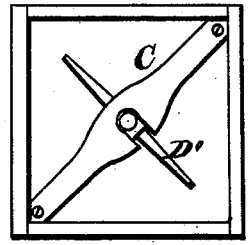
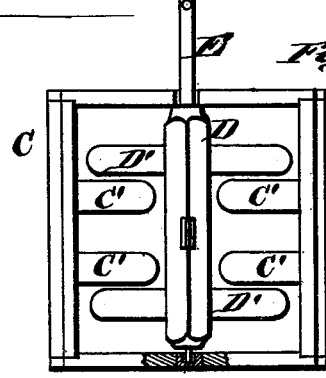
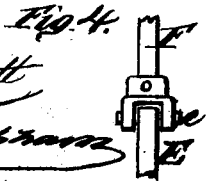
WITNESSES
INVENTORS.
ATTORNEYS.

UNITED STATES PATENT OFFICE.

THOMAS F. HATTON AND JOHN F. RECORD, OF AVON, INDIANA.

IMPROVEMENT IN ROTARY CHURNS.

Specification forming part of Letters Patent No. 191,676, dated June 5, 1877; application filed March 31, 1877.

*To all whom it may concern:*

Be it known that we, THOMAS F. HATTON and JOHN F. RECORD, of Avon, in the county of Hendricks and State of Indiana, have invented a new and valuable Improvement in Churns; and we do hereby declare that the following is a full, clear, and exact description of the construction and operation of the same, reference being had to annexed drawings, making a part of this specification, and to the letters and figures of reference marked thereon.

Figure 1 of the drawings is a representation of a front elevation of our churn with the door open, and Fig. 2 is a top view of the churn with the cover removed. Fig. 3 is a detached view of the churn-dasher, and Fig. 4 is a detail view.

This invention relates to churns, and to devices for automatically operating the same; and it consists in the construction, arrangement, and combination of the parts hereinafter described.

In the accompanying drawings, A designates a protecting casing for my apparatus, which is provided with a hinged door, A¹, and a vertical partition, A², which separates the space within said casing into two compartments. One of said compartments is further divided by a horizontal partition, a; and in the space below said latter partition is arranged a churn-box, B, which contains a diagonally-arranged frame, C, having inwardly-extending lugs or bars C' on each of its sides. Arms D' of rotating dasher D operate in the spaces between said lugs or bars, and are aided thereby in churning the cream. Said dasher is turned by means of a vertical shaft or rod, E, which is provided at its upper end with cross-pins e, that engage with recesses f of a flaring piece, F', on the lower end of a short shaft, F. Said shaft F is journaled in horizontal partition a, and in a downwardly-extending bearing-plate, a', attached thereto, and its upper end is provided with a pinion, G, that meshes with a crown-wheel, H, turned, through a train of gear-wheels, I, by a shaft, J, journaled in one side of the upper part of said casing A and in partition A². The end of said shaft J, which extends inward through said partition, has a clutch, K, fixed upon it, and is recessed to receive one journal of another shaft, J', which is journaled at the other end in the other side of casing or cabinet A. Said shaft J' is provided with a clutch, K', that is adapted to engage with clutch K when said shaft J' is turned in one direction, but not when it is turned in the opposite direction. Said clutch K' is forced toward said clutch K by a spring, L, that bears at its other end against a spool, M, on said shaft J'; and said clutch is guided in such motion by a pin, j, on said latter shaft, which pin sets in a slot, k, of said clutch. N designates a cord, attached at its upper end to said spool or drum M, and at its lower end to a suspended weight-holder, O, consisting of a disk, O¹, and a central vertical shank, O². On said disk weights P are piled, and shaft J' is turned by means of a crank-arm, Q, which sets on a prismatic end of said shaft, that extends through the side of casing or cabinet A.

When said apparatus is to be prepared for automatic churning, said crank is turned so that the clutches K K' will not engage, and the gearing will therefore remain unmoved while cord N is wound on drum M. The said crank is then released, and the weights P then cause shaft J' to turn in the opposite direction until clutch K' engages with clutch K, and shaft J is turned thereby, which rotation is communicated, through the gearing hereinbefore described, to the churn-dasher, and continued until the cord N is wholly unwound. The rapidity of this unwinding depends upon the number of weights piled upon the holder O. A different form of adjustable weight may be substituted therefor. The gearing may also be changed; and standards substituted for casing A.

What we claim as new, and desire to secure by Letters Patent, is—

The combination of shafts J J', clutches K K', spring L, drum M, cord or chain O, and weight or weights P with a rotating dasher-shaft and churn-dasher, an operating-crank, and suitable connecting-gearing, substantially as and for the purpose set forth.

In testimony that we claim the above we have hereunto subscribed our names in the presence of two witnesses.

THOMAS F. HATTON.
JOHN F. RECORD.

Witnesses:
JOHN PALMER,
W. A. MCADAMS.